Feb. 20, 1940.  C. P. POTTER  2,191,158
CONTROL SYSTEM FOR POLYPHASE MOTORS
Filed July 8, 1938
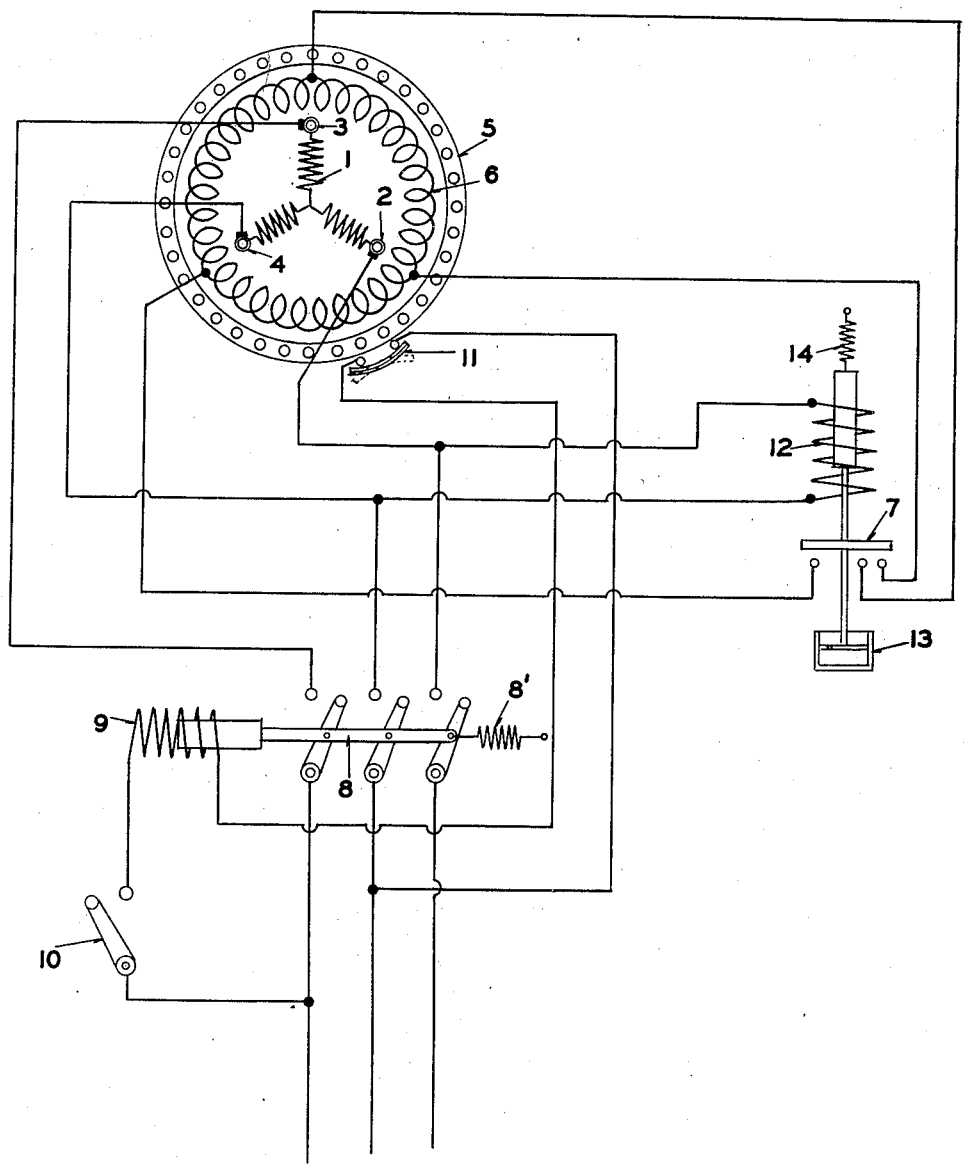
INVENTOR.
C.P. POTTER
BY
ATTORNEY.

Patented Feb. 20, 1940

2,191,158

UNITED STATES PATENT OFFICE 2,191,158

CONTROL SYSTEM FOR POLYPHASE MOTORS

Charles P. Potter, St. Louis, Mo., assignor to Wagner Electric Corporation, St. Louis, Mo., a corporation of Delaware Application July 8, 1938, Serial No. 218,054

2 Claims. (Cl. 172—274)

My invention relates to control of electric motors and more particularly to the control of alternating current polyphase motors having an induced member provided with a permanently short-circuited winding, usually of the squirrel-cage type, and with a winding which is inoperative at starting but is later rendered operative by short circuiting it along a plurality of axes.

The object of my invention is to provide convenient means, including a thermally responsive switch, to prevent injury to the motor by excessive heating due to overload.

In the accompanying drawing, which diagrammatically represents an embodiment of my invention, the rotor of the motor is provided with polyphase winding 1 supplied from the line by slip rings 2, 3 and 4 as indicated. The secondary or induced member carries a high resistance squirrel-cage winding 5 preferably located in the bottom of the stator slots, and a wire winding 6 which is inoperative at starting but subject to being rendered operative by short circuiting it along a plurality of axes by means of switch 7 and the conductors shown.

The line supply switch 8 is biased to open position by spring 8' and is held closed by solenoid 9 when the latter is energized. This solenoid circuit is supplied with energy from the line and its circuit includes the manual switch 10 and the normally closed thermally responsive switch 11, the thermally-operated element of which is so located as to be subject to variation in temperature of the squirrel-cage winding 5. It is adjusted to open switch 11 when the temperature of this squirrel-cage winding exceeds a predetermined value.

Switch 7, which controls the induced winding 6, is biased to open position by spring 14 and is closed by solenoid 12 which receives current from the supply source when the main switch 8 is closed. The operation of this switch 12 is affected by time delay means, such as dashpot 13, whereby switch 7 will not come to closed position until a few seconds after line switch 8 has been closed.

Referring to the operation of the control system described, the closing of manual switch 10 causes the circuit of solenoid 9 to be energized and the main supply switch 8 of the motor to close. Solenoid 12, which is in circuit across two of the motor leads, is then energized and the motion of switch 7 toward closed position is initiated. During this starting period the high resistance squirrel-cage produces good starting torque and the motor normally attains substantial speed before switch 7 closes, the control mechanism parts of the switch being preferably designed to delay its closing until approximately five seconds after the main switch 8 is closed.

When switch 7 closes, the winding 6 becomes effective and the motor accelerates to its normal running speed and the current in the squirrel-cage winding is reduced and the development of excessive heat therein, due to its high resistance, is avoided. However, should the machine become overloaded, switch 11, which is thermally responsive to the excess heat in the stator winding which would be developed, opens and thus deenergizes solenoid 9, permitting the main line switch to open. The opening of this switch also results in deenergization of solenoid 12, permitting the spring 14 to open switch 7, whereby all parts of the apparatus are returned to the condition existing before starting.

Should switch 7 fail to function as intended during the starting operation, the excess heat which would be developed in the squirrel-cage winding 5 under this condition, would result in the opening of the line switch and thus under no condition can the motor remain connected to the line long enough to cause injury from overheating.

Having fully described my invention, what I claim as new and desire to secure by Letters Patent of the United States is:

1. In combination with a polyphase motor provided with a stationary induced member having a polyphase winding inoperative at starting and a high resistance winding short-circuited along a plurality of axes, supply switch control means comprising a supply control circuit embodying a normally closed switch having an actuating element responsive to the temperature of the high resistance winding and a solenoid for holding the supply switch in closed position, and time delay switch means controlled by the supply switch and adapted to render the polyphase winding on the induced member operative after a predetermined interval following the closing of the line supply switch, said last named switch being released to assume open position when the line switch is opened.

2. The combination with a polyphase motor provided with a stationary induced member having a high resistance winding short-circuited along a plurality of axes and a polyphase winding inoperative at starting, of a line supply switch biased to open position, automatic means for short-circuiting the polyphase winding to render the same operative, said means embodying time delay means controlled by the supply switch and preventing the short circuiting of said winding until after a predetermined interval following the closing of the line supply switch, and means responsive to excessive temperature in the high resistance winding for automatically causing the opening of the main supply switch.

CHARLES P. POTTER.